United States Patent
Larsen et al.

(10) Patent No.: US 9,669,582 B2
(45) Date of Patent: Jun. 6, 2017

(54) EXTRUSION APPARATUS AND METHOD

(71) Applicant: The Boeing Company, Chicago, IL (US)

(72) Inventors: Ty A. Larsen, Everett, WA (US); Richard E. Murrish, Snohomish, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/378,126

(22) Filed: Dec. 14, 2016

(65) Prior Publication Data

US 2017/0120516 A1 May 4, 2017

Related U.S. Application Data

(62) Division of application No. 14/174,892, filed on Feb. 7, 2014, now Pat. No. 9,550,319.

(51) Int. Cl.
*B29C 67/00* (2017.01)
*B33Y 10/00* (2015.01)
*B33Y 30/00* (2015.01)
*B33Y 50/02* (2015.01)
(Continued)

(52) U.S. Cl.
CPC ...... *B29C 67/0055* (2013.01); *B29C 67/0085* (2013.01); *B29C 67/0088* (2013.01); *B33Y 10/00* (2014.12); *B33Y 30/00* (2014.12); *B33Y 50/02* (2014.12); *B33Y 80/00* (2014.12); *B29K 2905/00* (2013.01); *B29L 2031/3076* (2013.01)

(58) Field of Classification Search
CPC ............ B29C 67/0055; B29C 67/0085; B29C 47/122; B29C 47/24; B28B 3/26; B28B 3/2654

USPC .................................................... 425/382.3
See application file for complete search history.

(56) References Cited

U.S. PATENT DOCUMENTS

| 1,824,482 A | 9/1931 | Hartmann |
| 5,121,329 A | 6/1992 | Crump |
| 5,529,471 A | 6/1996 | Khoshevis |

(Continued)

FOREIGN PATENT DOCUMENTS

| EP | 0833237 | 9/2001 |
| EP | 1488908 | 12/2004 |

(Continued)

OTHER PUBLICATIONS

Bellini, Anna. "Fused Deposition of Ceramics: A Comprehensive Experimental, Analytical, and Computational Study of Material Behavior, Fabrication Process, and Equipment Design." Drexel Theses and Dissertations, Drexel University, Philadelphia, PA. (Sep. 2002).

(Continued)

*Primary Examiner* — Timothy Kennedy
(74) *Attorney, Agent, or Firm* — Perman & Green, LLP

(57) ABSTRACT

One aspect of the disclosure relates to an apparatus including an extrusion nozzle. The nozzle includes an inlet end, an outlet end opposite the inlet end and an axis extending between the inlet end and the outlet end. The extrusion nozzle is configured to rotate about the axis. The extrusion nozzle also includes a rotary drive engagement portion between the inlet end and the outlet end. The extrusion nozzle further includes a cavity including an inlet opening at the inlet end and an outlet opening at the outlet end. The inlet opening has a different configuration than the outlet opening.

20 Claims, 10 Drawing Sheets

(51) Int. Cl.
  *B33Y 80/00*   (2015.01)
  *B29L 31/30*   (2006.01)

(56) References Cited

U.S. PATENT DOCUMENTS

| | | |
|---|---|---|
| 6,030,199 A | 2/2000 | Tseng |
| 6,280,785 B1 | 8/2001 | Yang et al. |
| 6,303,180 B1 | 10/2001 | Bunyan et al. |
| 6,372,178 B1 | 4/2002 | Tseng |
| 2006/0288820 A1 | 12/2006 | Mirchandani et al. |

FOREIGN PATENT DOCUMENTS

| | | |
|---|---|---|
| EP | 2170571 | 2/2009 |
| JP | 2003155605 | 5/2003 |
| WO | 03101630 | 12/2003 |
| WO | 2007130229 | 11/2007 |
| WO | 2009017739 | 2/2009 |
| WO | 2012088257 | 6/2012 |

OTHER PUBLICATIONS

Hongkyu, et al. "Effects of Orifice Shape in Contour Crafting of Ceramic Materials". Rapid Prototyping Journal; vol. 8, No. 3; (2002) pp. 147-160.

European Search Report, European Application No. 15153982.2-1706, dated Jun. 9, 2015.

EXTRUSION APPARATUS AND METHOD

CROSS REFERENCE TO RELATED APPLICATIONS

This application is a division of and claims the benefit of non-provisional patent application Ser. No. 14/174,892 filed on Feb. 7, 2014 the disclosure of which is incorporated herein by reference in its entirety.

BACKGROUND

Fused deposition modelling includes extruding material from a nozzle and depositing the material onto a platform in layers or beads. The outlet orifices of most commercially available extrusion nozzles are circular, thus limiting the contact area between the deposited layers and, accordingly, reducing the strength of the final part. In some instances, the nozzles are provided with non-circular orifices. However, such nozzles are oriented relative to the workpiece using passive orientation techniques. For example, nozzle-to-workpiece orientation may be passively provided by a trowel guide that extends from the nozzle and follows the side surface of a previously deposited bead of material. Nozzles including a trowel guide may limit the shapes of the parts produced by fused deposition modelling because the trowel guide may not be able to follow the contours of the workpiece precisely and may dig into the previously deposited material as the nozzle is moved along the workpiece, damaging the workpiece and/or the nozzle.

SUMMARY

Accordingly, an extrusion apparatus and method, intended to address the above-identified concerns, would find utility.

One example of the present disclosure relates to an apparatus including an extrusion nozzle. The nozzle includes an inlet end, an outlet end opposite the inlet end and an axis extending between the inlet end and the outlet end. The extrusion nozzle is configured to rotate about the axis. The extrusion nozzle also includes a rotary drive engagement portion between the inlet end and the outlet end. The extrusion nozzle further includes a cavity including an inlet opening at the inlet end and an outlet opening at the outlet end. The inlet opening has a different configuration than the outlet opening.

One example of the present disclosure relates to a method of extruding material. The method includes providing an extrusion nozzle that includes a rotary drive engagement portion, an inlet end, an inlet opening at the inlet end, an outlet end, and an outlet opening at the outlet end. The method also includes moving the extrusion nozzle along a tool path and simultaneously rotating the extrusion nozzle about a rotary axis using the rotary drive engagement portion to maintain the outlet opening of the extrusion nozzle in a predetermined orientation relative to the tool path while extruding material from the outlet opening.

BRIEF DESCRIPTION OF THE DRAWINGS

Figure 1:
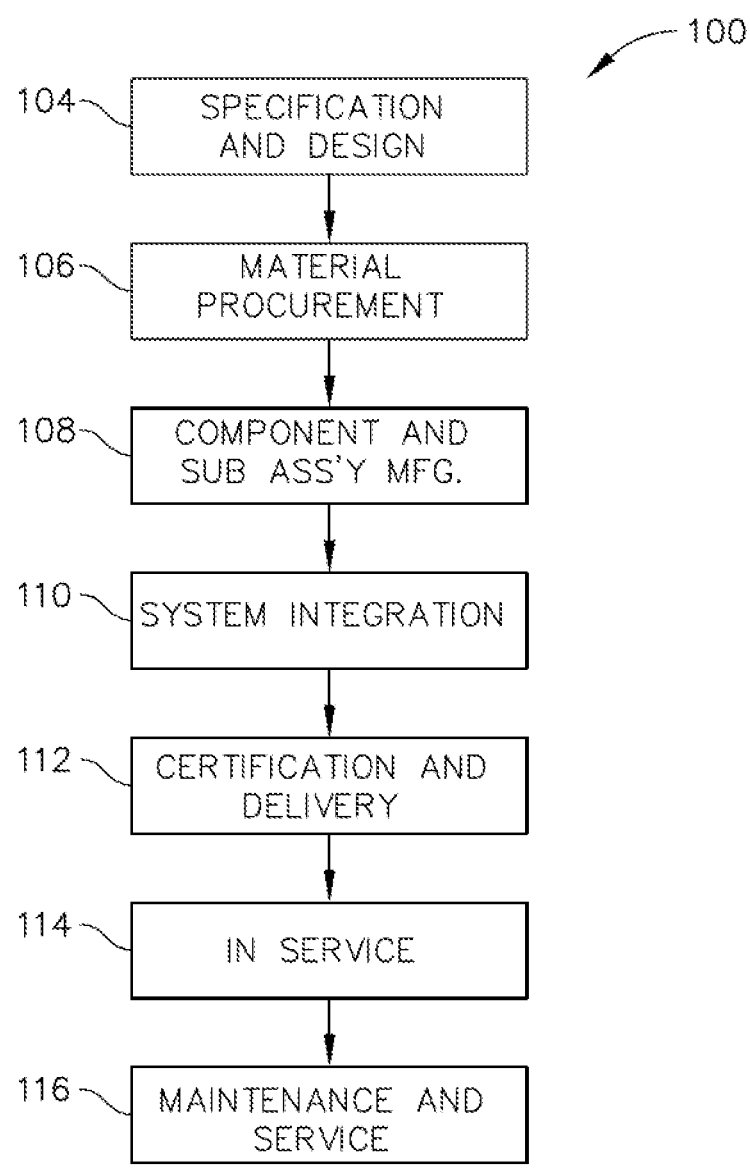
Figure 2:
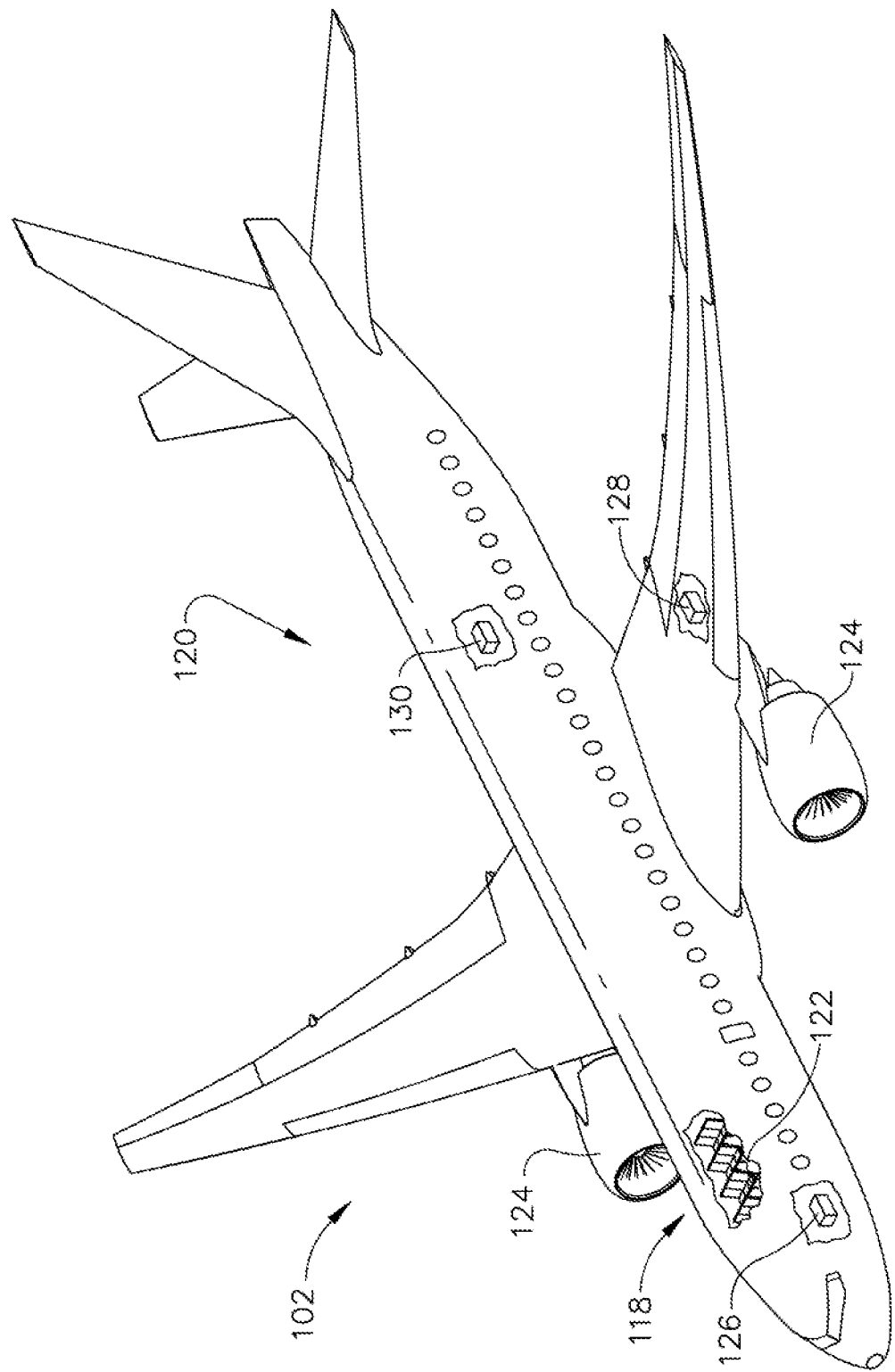
Figure 3:
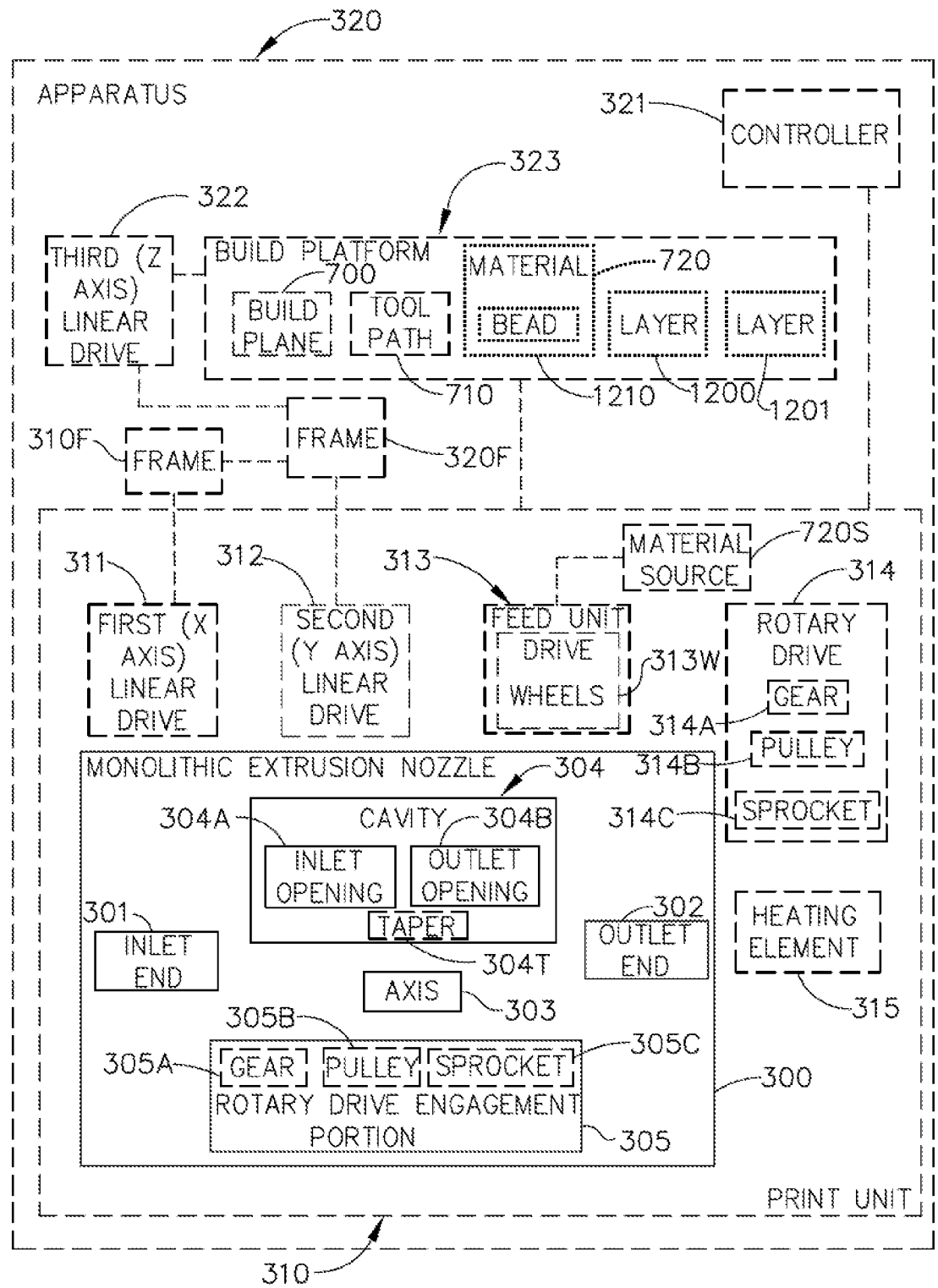
Figure 4:
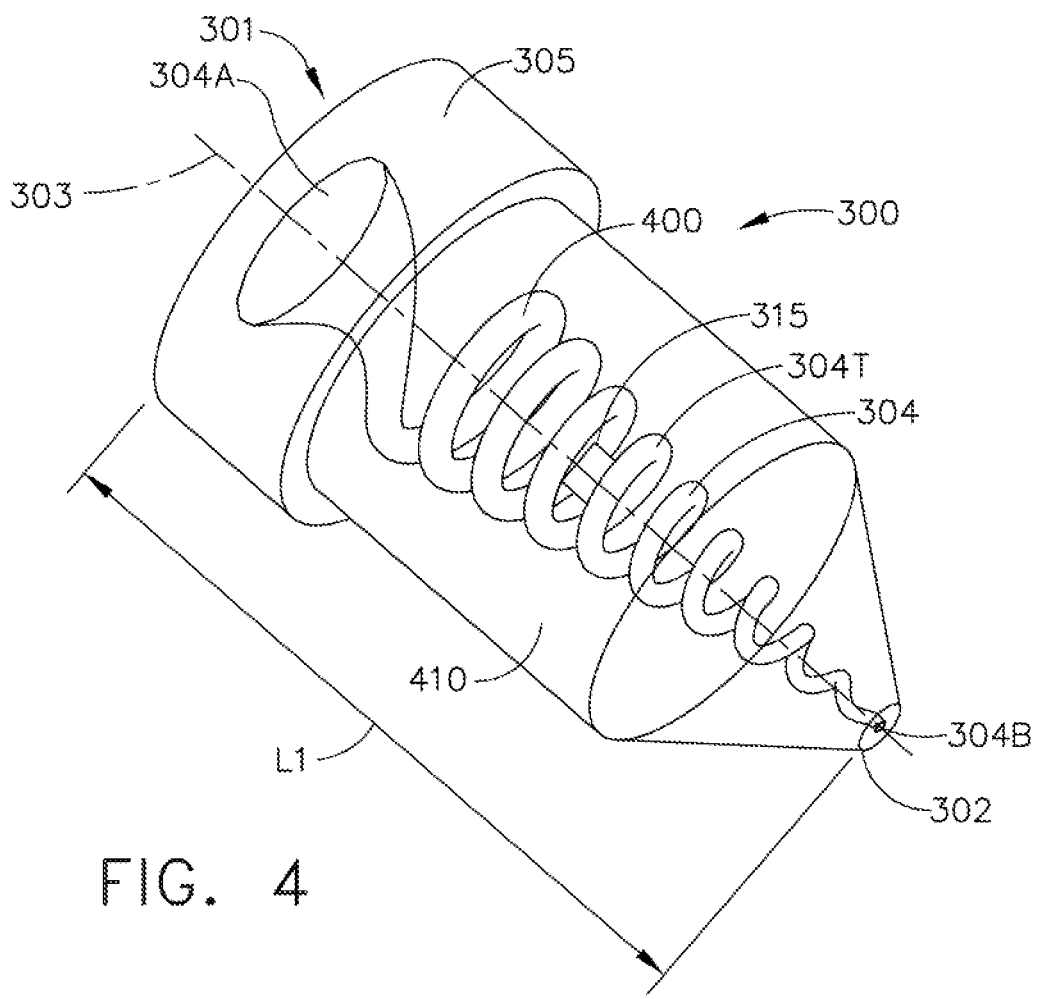
Figure 5:
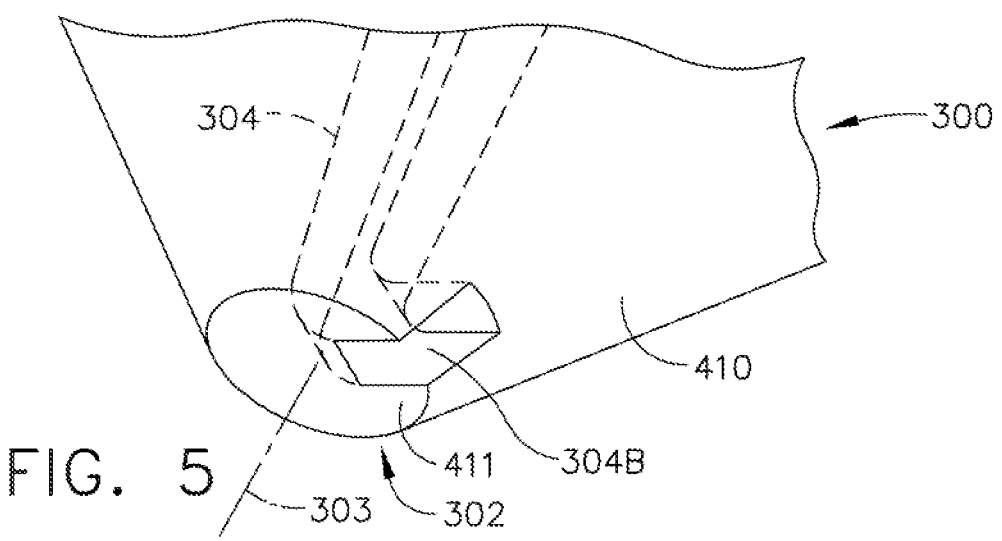
Figure 6:
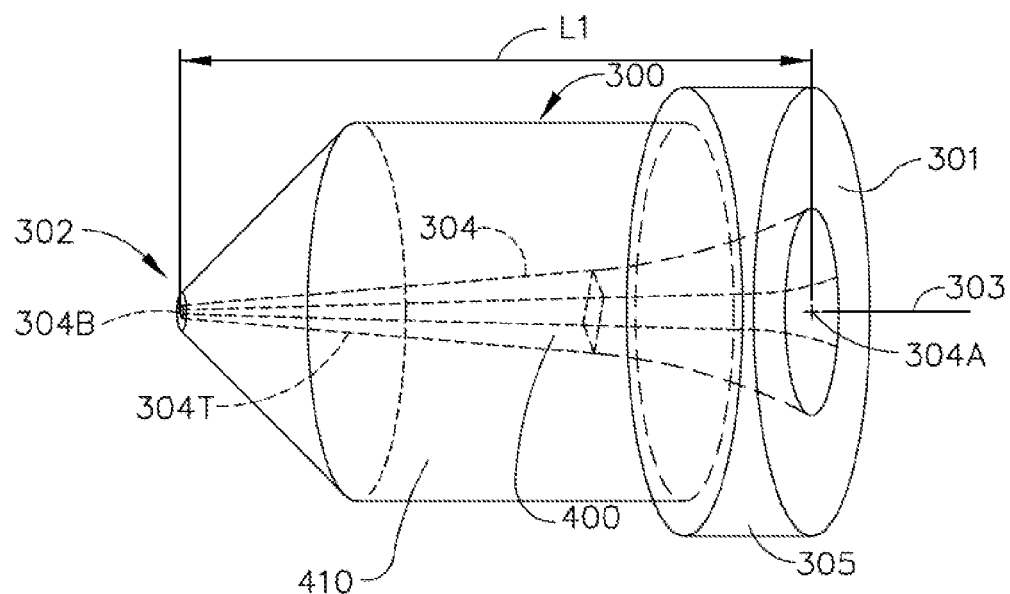
Figure 7:
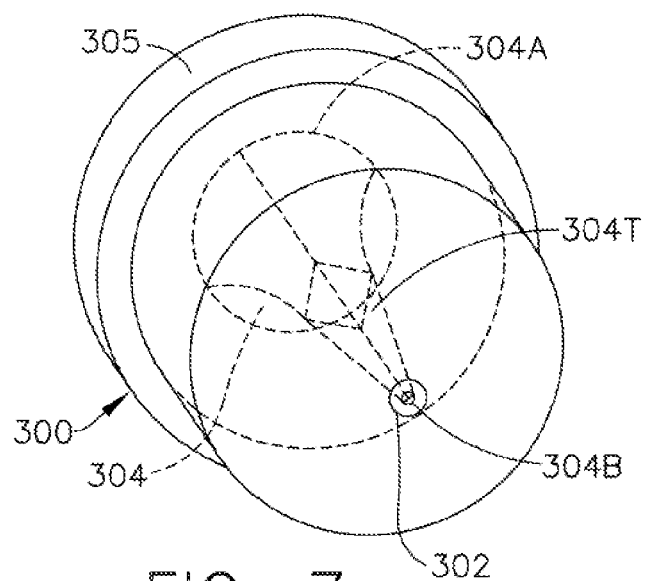
Figure 8:
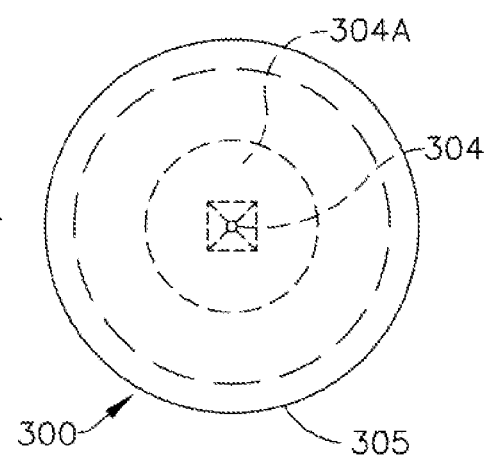
Figure 8A:
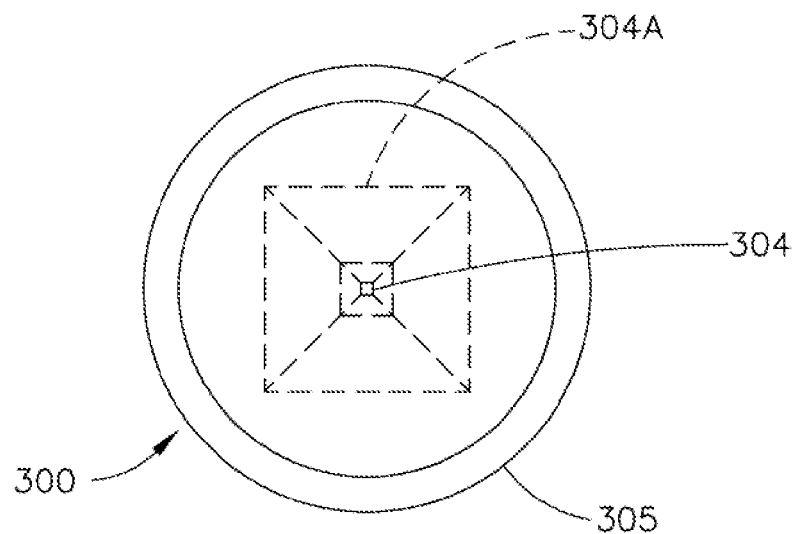
Figure 10A:
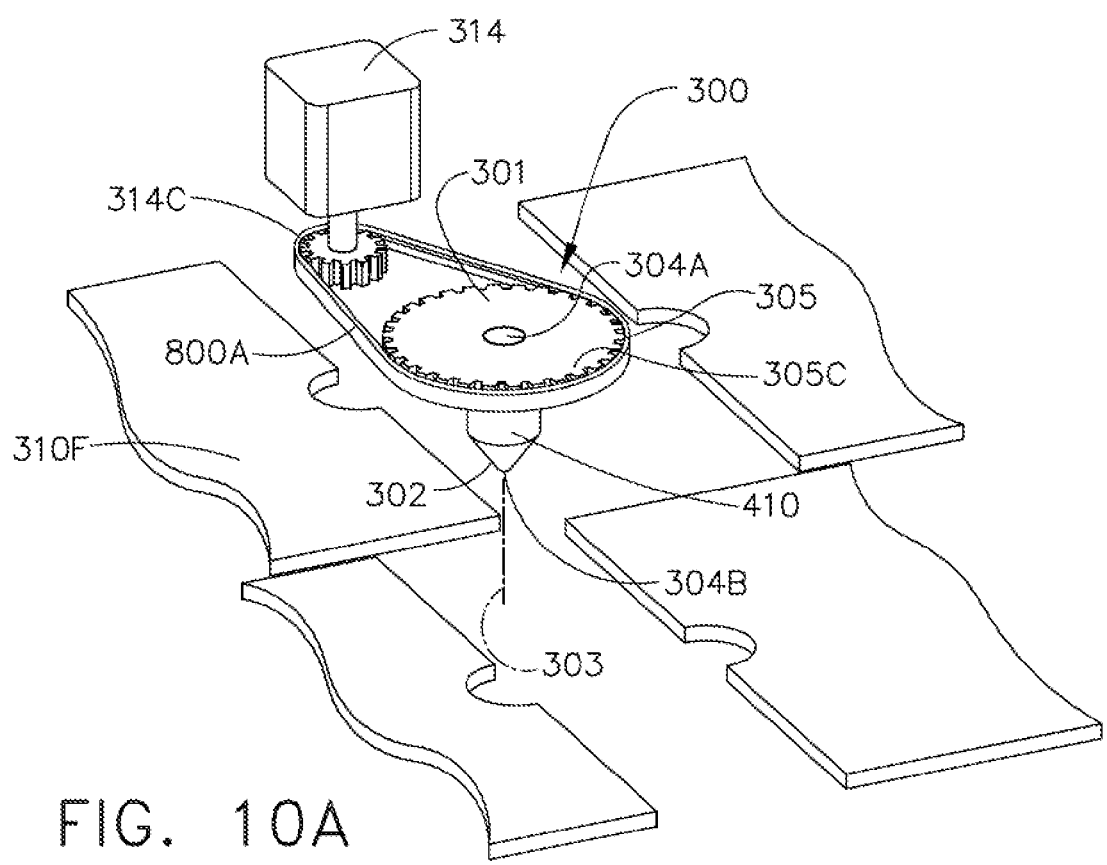
Figure 9:
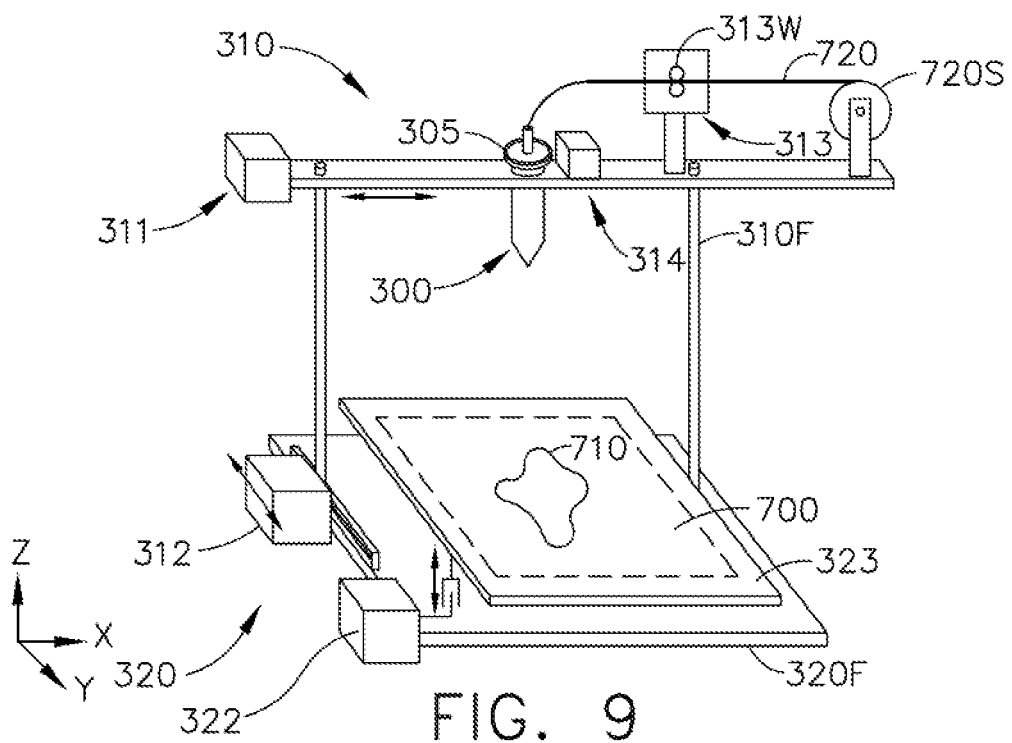
Figure 10:
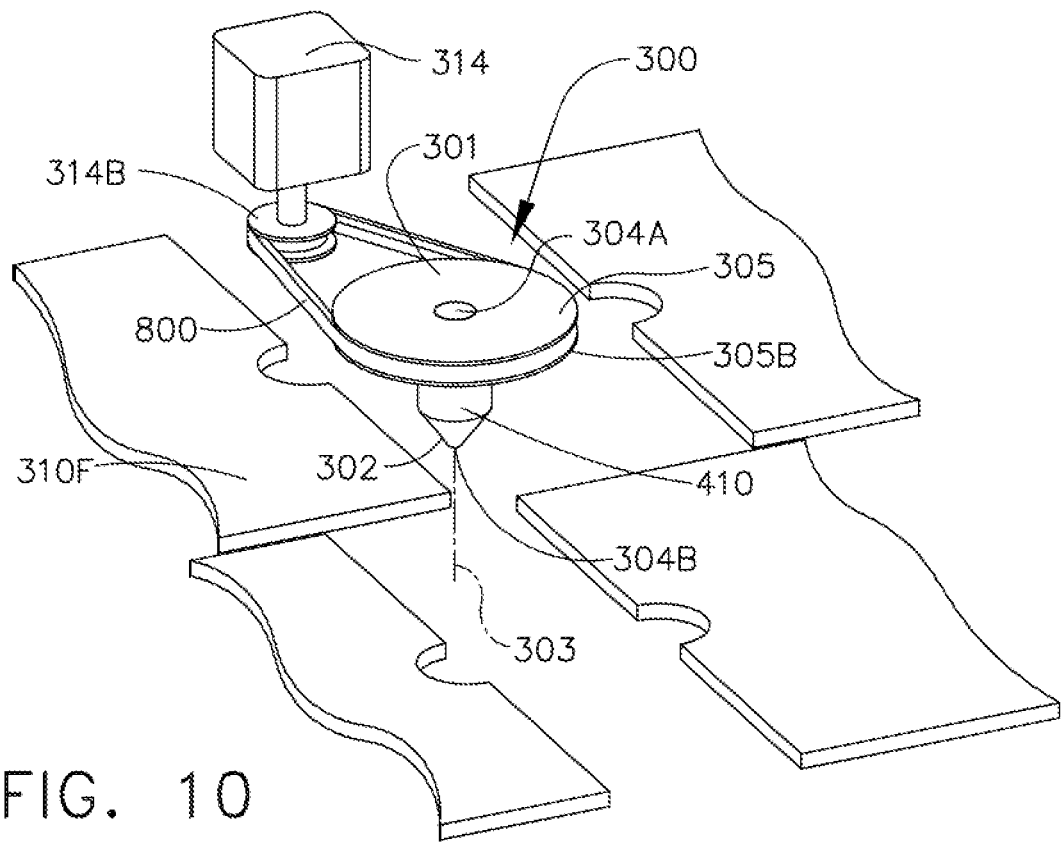
Figure 11:
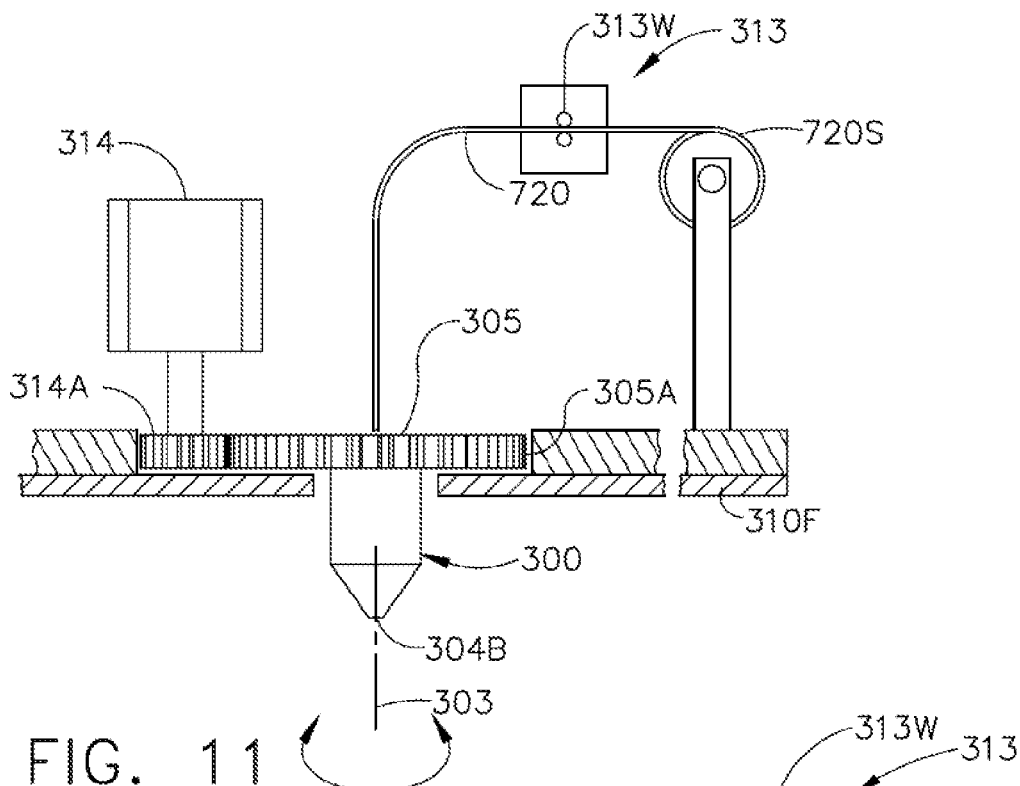
Figure 12:
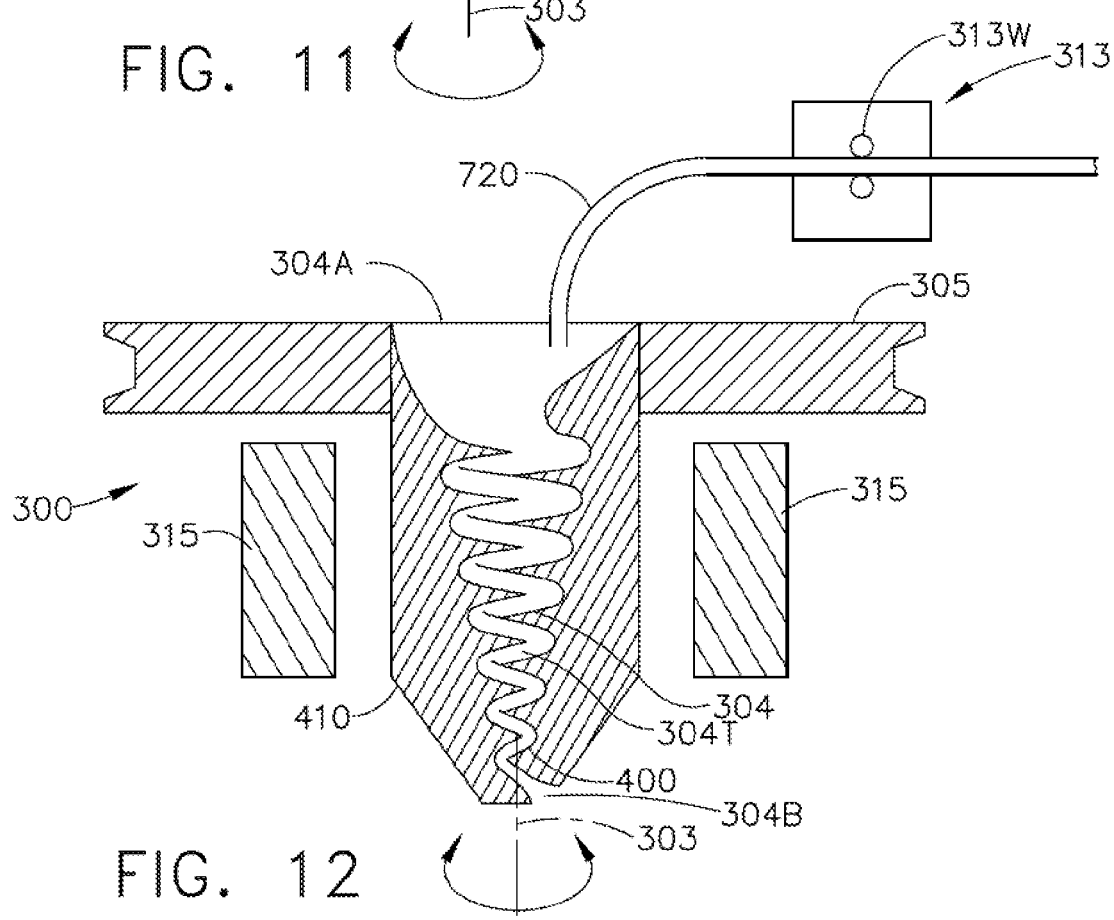
Figure 13:
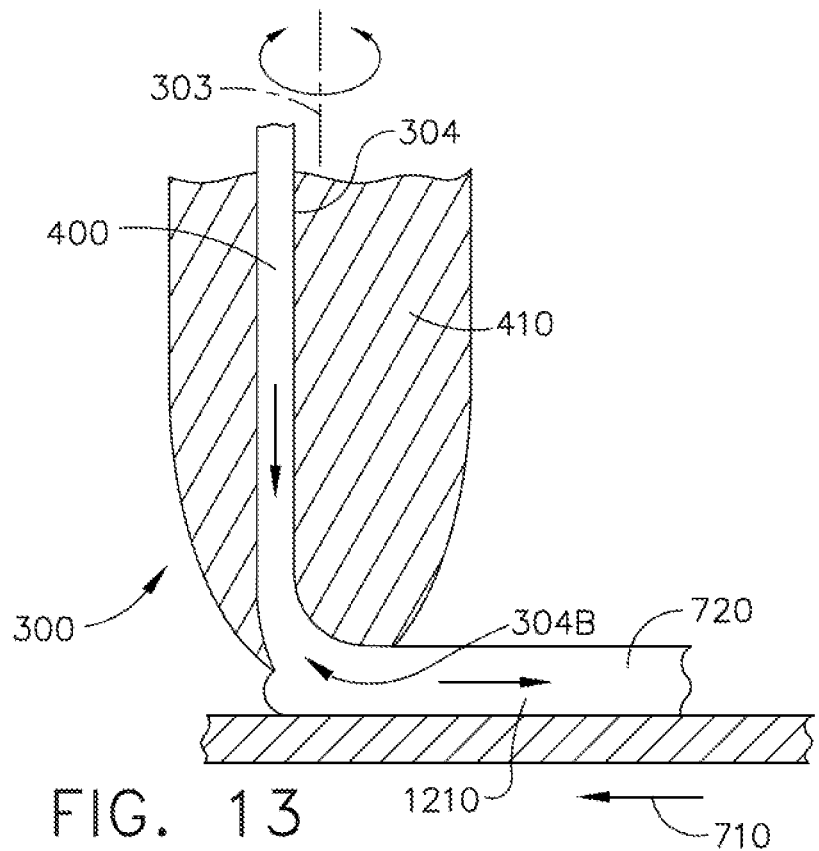
Figure 14:
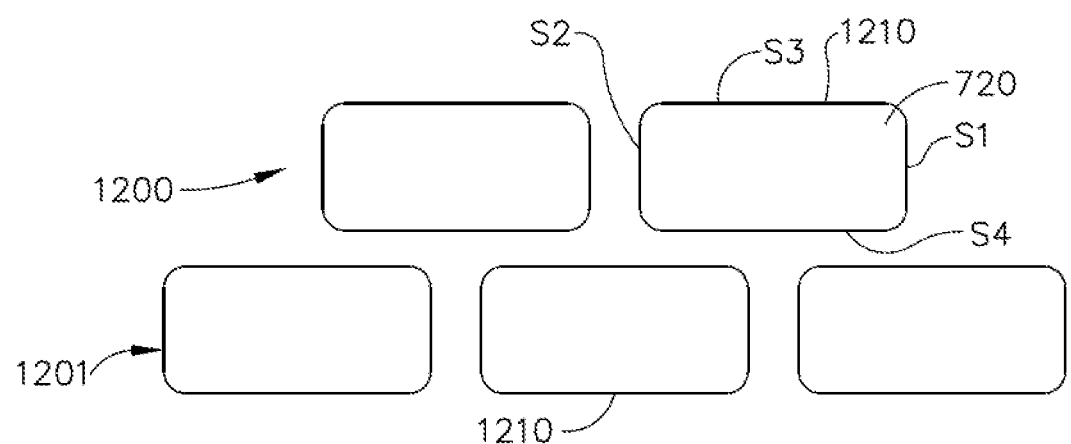
Figure 15:
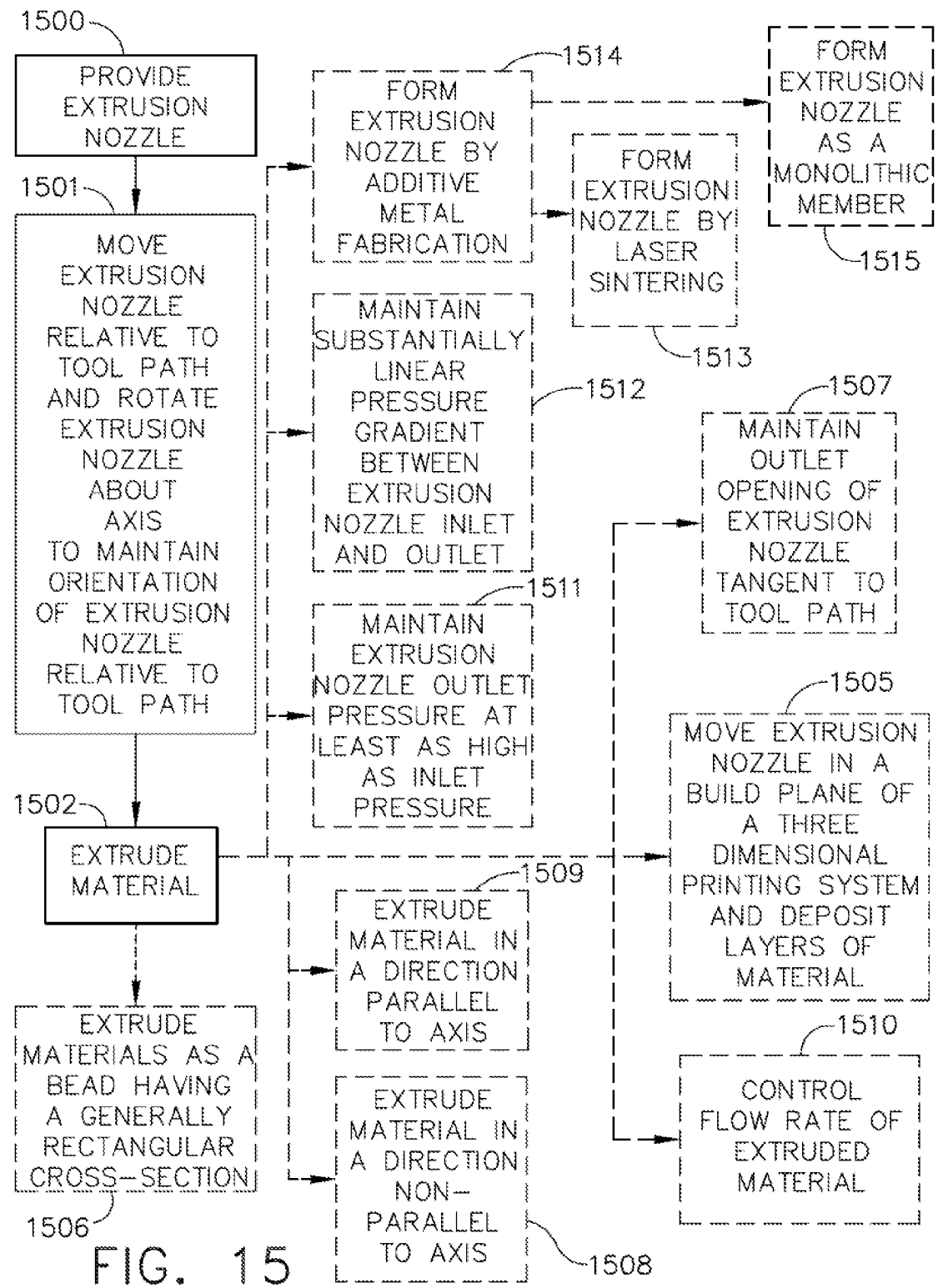

Having thus described examples of the disclosure in general terms, reference will now be made to the accompanying drawings, which are not necessarily drawn to scale, and wherein like reference characters designate the same or similar parts throughout the several views, and wherein:

FIG. 1 is a flow diagram of aircraft production and service methodology in accordance with aspects of the present disclosure;

FIG. 2 is a block diagram of an aircraft;

FIG. 3 is a block diagram of an apparatus according to one aspect of the present disclosure;

FIG. 4 is a schematic illustration of a extrusion nozzle of the apparatus of FIG. 3 according to one aspect of the present disclosure;

FIG. 5 is a schematic illustration of a portion of the extrusion nozzle of the apparatus of FIG. 3 according to one aspect of the present disclosure;

FIG. 6 is a schematic side perspective view of the extrusion nozzle of the apparatus of FIG. 3 according to one aspect of the present disclosure;

FIG. 7 is a schematic bottom perspective view of the extrusion nozzle of the apparatus of FIG. 6 according to one aspect of the present disclosure;

FIG. 8 is a schematic bottom plan view of the extrusion nozzle of the apparatus of FIG. 7 according to one aspect of the present disclosure:

FIG. 8A is a schematic bottom elevation view of the extrusion nozzle of the apparatus of FIG. 3 according to one aspect of the present disclosure;

FIG. 9 is a schematic illustration of the apparatus of FIG. 3 according to one aspect of the present disclosure;

FIG. 10 is a schematic perspective view of a detail of the apparatus of FIG. 3 according to one aspect of the present disclosure;

FIG. 10A is a schematic perspective view of a detail of the apparatus of FIG. 3 according to one aspect of the present disclosure;

FIG. 11 is a schematic side elevation view of a detail of the apparatus of FIG. 3 according to one aspect of the present disclosure;

FIG. 12 is a schematic illustration of the extrusion nozzle and a heating element of FIG. 3 according to one aspect of the present disclosure;

FIG. 13 is a schematic illustration of a portion of the extrusion nozzle of FIG. 3 depositing material along a tool path according to one aspect of the present disclosure;

FIG. 14 is a schematic illustration of deposited material in accordance one aspect of the present disclosure; and FIG. 15 is a block diagram of a method of extruding material according to one aspect of the present disclosure.

In the block diagram(s) referred to above, solid lines connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagram(s) may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with dashed lines, indicate alternative or optional aspects of the disclosure. Environmental elements, if any, are represented with dotted lines.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Examples of the disclosure may be described in the context of an aircraft manufacturing and service method 100 as shown in FIG. 1 and an aircraft 102 as shown in FIG. 2. During pre-production, illustrative method 100 may include specification and design 104 of the aircraft 102 and material procurement 106. During production, component and subassembly manufacturing 108 and system integration 110 of the aircraft 102 take place. Thereafter, the aircraft 102 may go through certification and delivery 112 to be placed in service 114. While in service by a customer, the aircraft 102 is scheduled for routine maintenance and service 116 (which may also include modification, reconfiguration, refurbishment, and so on).

Each of the processes of the illustrative method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 2, the aircraft 102 produced by the illustrative method 100 may include an airframe 118 with a plurality of high-level systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive and ship-building industries, among others.

Apparatus and methods shown or described herein may be employed during any one or more of the stages of the manufacturing and service method 100. For example, components or subassemblies corresponding to component and subassembly manufacturing 108 may be fabricated or manufactured in a manner similar to components or subassemblies produced while the aircraft 102 is in service. Also, one or more aspects of the apparatus, method, or a combination thereof may be utilized during the production stages 108 and 110, for example, by substantially expediting assembly of or reducing the cost of the aircraft 102. Similarly, one or more aspects of the apparatus or method realizations, or a combination thereof may be utilized, for example and without limitation, while the aircraft 102 is in service, e.g., maintenance and service 116.

Referring to FIGS. 3-13 and in particular FIG. 3, one example of the present disclosure relates to an apparatus 320 including an extrusion nozzle 300. The nozzle includes an inlet end 301, an outlet end 302 opposite the inlet end 301, and an axis 303, extending between the inlet end 301 and the outlet end 302. The extrusion nozzle 300 is configured to rotate about the axis 303. The extrusion nozzle 300 also includes a rotary drive engagement portion 305 between the inlet end 301 and the outlet end 302. The extrusion nozzle 300 further includes a cavity 304, including an inlet opening 304A at the inlet end 301 and an outlet opening 304B at the outlet end 302. The inlet opening 304A has a different configuration than the outlet opening 304B. In one aspect of the disclosure, which may include at least a portion of the subject matter of any of the preceding and/or following examples and aspects, the extrusion nozzle is monolithic.

Referring to FIG. 8A, in one aspect of the disclosure, which may include at least a portion of the subject matter of any of the preceding and/or following examples and aspects, the inlet opening 304A of the cavity 304 has a non-circular shape. The non-circular shape may be any suitable shape, such as rectangular, triangular, or any other shape to facilitate entry of material 720 (FIG. 9) into the cavity 304 when the material 720 is in the form of a filament with a cross-section having a mating non-circular shape. Referring to FIGS. 4, 6, 7, and 8, in one aspect of the disclosure, which may include at least a portion of the subject matter of any of the preceding and/or following examples and aspects, the inlet opening 304A of the cavity 304 has a circular shape that facilitates entry of the material 720 (e.g., FIG. 9) into the cavity 304 when the material 720 is in the form of a filament with a cross-section also having a circular shape.

Referring, e.g., to FIG. 5, in one aspect of the disclosure, which may include at least a portion of the subject matter of any of the preceding and/or following examples and aspects, the outlet opening 304B of the cavity 304 has a non-circular shape configured, as shown in FIG. 14, to deposit beads 1210 of the material 720 where each of the beads 1210 has, e.g., a rectangular cross-section so that the bottom sides S4 of the subsequently deposited beads 1210 are parallel with the top sides S3 of the previously deposited beads 1210, maximizing the contact area between the deposited layers and, accordingly, increasing the strength of the final part, as will be described in greater detail below.

Referring once again to FIG. 5 and FIGS. 13 and 14, in one aspect of the disclosure, which may include at least a portion of the subject matter of any of the preceding and/or following examples and aspects, the outlet opening 304B of the cavity 304 is a non-planar opening, such that the outlet opening 304B is formed in more than one portion of the extrusion nozzle 300. In one aspect of the disclosure, which may include at least a portion of the subject matter of any of the preceding and/or following examples and aspects, the non-planar opening of the outlet opening 304B is formed at least partly on a side portion 410 of the extrusion nozzle 300 and is configured to extrude material 720 in a direction angled relative to the axis 303 so that the extruded material 720 is laid down on a previously deposited layer 1201 (FIG. 14) without stretching/thinning the extruded material 720 due to, for example, friction between the extruded material and the previously deposited layer 1201 and to promote an increased area of adhesion between layers (e.g. due to a lack of stretching of the material 720 as it is deposited). In addition to the side portion 410, the outlet opening may also be formed on a front portion 411.

Referring to FIG. 4, in one aspect of the disclosure, which may include at least a portion of the subject matter of any of the preceding and/or following examples and aspects, the outlet opening 304B of the cavity 304 has a circular shape for depositing beads of material, e.g., into channels or grooves have a semi-circular cross-section. Referring to FIG. 7, in one aspect, the outlet opening 304B may be a planar opening configured to extrude material 720 in a direction substantially along or substantially parallel with the axis 303.

Referring to FIGS. 4, 6, 7 and 8, in one aspect of the disclosure, which may include at least a portion of the subject matter of any of the preceding and/or following examples and aspects, at least a portion of the cavity 304 includes a circular cross-section, e.g., to facilitate entry of the material 720 (e.g., FIG. 9) into the cavity 304 when the material 720 is in the form of a filament with a cross-section having a circular shape. In one example, illustrated in FIG. 4, the cavity 304 has a circular cross-section along its entire length. In another example, illustrated in FIGS. 6-8, the cavity has a circular cross-section along a portion of its length.

Referring once again to FIGS. 6-8, in one aspect of the disclosure, which may include at least a portion of the subject matter of any of the preceding and/or following examples and aspects, the cavity 304 includes a non-circular cross section along a portion of its length, e.g., so that the cavity 304 mates with the outlet opening 304B when the outlet opening 304B has a corresponding non-circular shape. The circular and non-circular portions of the cavity 304 have a blended interface to facilitate the flow of the material 720 through the cavity. Alternatively, the cavity 304 may have a non-circular cross section along its entire length. In accordance with aspects of the present disclosure, the circular and/or non-circular cross section of the cavity may allow for different inlet opening and outlet opening shapes.

Referring, e.g., to FIGS. 6-8A, in one aspect of the disclosure, which may include at least a portion of the subject matter of any of the preceding and/or following examples and aspects, the cavity 304 has a path 400 that is substantially linear to provide increased volumetric flow of the material 720 through the cavity 304. Referring to FIGS. 4 and 12, in one aspect of the disclosure, which may include at least a portion of the subject matter of any of the preceding and/or following examples and aspects, the path 400 is substantially non-linear. For example, referring to FIG. 4, in one aspect of the disclosure, which may include at least a portion of the subject matter of any of the preceding and/or following examples and aspects, the path 400 of the cavity 304 is a tortuous path. Still referring to FIG. 4, in one aspect of the disclosure, which may include at least a portion of the subject matter of any of the preceding and/or following examples and aspects, a length of the cavity 304 is greater than a length L1 of the extrusion nozzle 300. This configuration maximizes heat exposure (discussed below) of the material 720 extruded through the cavity 304, allowing a reduction in the length of the nozzle 300 and/or the amount of energy required for heating the nozzle 300 and the material 720, which promotes compactness of the apparatus 320. In one aspect of the disclosure, which may include at least a portion of the subject matter of any of the preceding and/or following examples and aspects, the path 400 is a spiral path that serves to accommodate, inter alia, central placement of a heating element (described in detail below) inside the extrusion nozzle 300, making the assembly more compact and promoting uniform heat distribution within the extrusion nozzle 300.

Referring to, e.g., FIGS. 3, 4, 6, 7, and 12, in one aspect of the disclosure, which may include at least a portion of the subject matter of any of the preceding and/or following examples and aspects, the cavity 304 includes a taper 304T, inter alia, to avoid an excessive pressure drop along the cavity 304. Accordingly, in one aspect of the disclosure, which may include at least a portion of the subject matter of any of the preceding and/or following examples and aspects, the cavity 304 is narrower near the outlet end 302 than near the inlet end 301. In one aspect of the disclosure, which may include at least a portion of the subject matter of any of the preceding and/or following examples and aspects, the taper 304T is smooth to promote uniform flow of the material 720 along the cavity 304.

Referring to FIGS. 10, 10A, and 11, respectively, in one aspect of the disclosure, which may include at least a portion of the subject matter of any of the preceding and/or following examples and aspects, the rotary drive engagement portion 305 of the extrusion nozzle 300 includes one of a pulley 305B, a sprocket 305C, or a gear 305A. In one aspect of the disclosure, which may include at least a portion of the subject matter of any of the preceding and/or following examples and aspects, the rotary drive engagement portion 305 is symmetric about the axis 303. For example, each of the pulley 305B, the sprocket 305C, or the gear 305A may be circular in shape and may have a rotational symmetry axis coincident with the axis 303. In one aspect of the disclosure, which may include at least a portion of the subject matter of any of the preceding and/or following examples and aspects, the rotary drive engagement portion 305 at least partially circumscribes the axis 303. In other words, with the nozzle 300 in a stationary state, the rotary drive engagement portion 305 may span an angle of less than 360 degrees relative to the axis 303.

Referring to FIGS. 3, 4, and 12, in one aspect of the disclosure, which may include at least a portion of the subject matter of any of the preceding and/or following examples and aspects, the apparatus 320 further includes at least one heating element 315, thermally coupled with the extrusion nozzle 300. One or more heating elements 315 may be located in various suitable orientations relative to the extrusion nozzle 300. For example, as shown in FIG. 4, the heating element or elements 315 may be located within the extrusion nozzle 300 or, as illustrated in FIG. 12, may be external to the extrusion nozzle 300. As shown in FIG. 12, in one aspect of the disclosure, which may include at least a portion of the subject matter of any of the preceding and/or following examples and aspects, the heating element 315 is farther from the axis 303 than the cavity 304. For example, the heating element 315 may be externally adjacent the side portion 410 of the extrusion nozzle 300. As shown in FIG. 4, in one aspect of the disclosure, which may include at least a portion of the subject matter of any of the preceding and/or following examples and aspects, the heating element 315 may be positioned at least partially within the extrusion nozzle so that the cavity 304 surrounds the at least one heating element 315. Referring, for example, to FIG. 4, in one aspect of the disclosure, which may include at least a portion of the subject matter of any of the preceding and/or following examples and aspects, the path 400 of the cavity 304 is a spiral path positioned around the at least one heating element 315, which may be disposed at least partially within the extrusion nozzle 300.

Referring to FIG. 9, in one aspect of the disclosure, which may include at least a portion of the subject matter of any of the preceding and/or following examples and aspects, the apparatus 320 is a three-dimensional printing system that includes a build platform 323 having a build plane 700. The apparatus 320 also includes a print unit 310 that includes the extrusion nozzle 300. The print unit 310 and the build platform 323 are movable relative to each other. The apparatus 320 may include a frame 320F to which the build platform 323 and print unit 310 are mounted. In one aspect of the disclosure, which may include at least a portion of the subject matter of any of the preceding and/or following examples and aspects, the print unit 310 further includes a rotatory drive 314, configured to engage the rotary drive engagement portion 305 of the extrusion nozzle 300 and to rotate the extrusion nozzle 300 about the axis 303. Referring to FIGS. 10, 10A, and 11, respectively, the rotary drive 314 may include one of a pulley 314B, a sprocket 314C, or a gear 314A configured engage a corresponding one of the pulley 305B, the sprocket 305C, or the gear 305A of the rotary drive engagement portion 305. In one aspect of the disclosure, which may include at least a portion of the subject matter of any of the preceding and/or following examples and aspects, the rotary drive 314 is configured to directly drive the rotary drive engagement portion 305 of the extrusion nozzle 300. Referring to FIGS. 10 and 10A, respectively, in one aspect, the rotary drive 314 may engage the rotary drive engagement portion 305 through a belt 800 or chain 800A. Referring to FIG. 11, in another aspect of the disclosure, the rotary drive 314 engages the rotary drive engagement portion 305 through a direct gear drive. In still other aspects, the rotary drive 314 may drive the rotary drive engagement portion 305 through any suitable transmission, such as a gear box (not shown), so that the rotary drive engagement portion 305 rotates faster or slower than the rotary drive 314.

Referring to FIGS. 10 and 11, the print unit 310 may include a frame 310F that is movably mounted to the frame 320F. The extrusion nozzle 300 may be movably mounted to the frame 310F. Referring to FIGS. 9, 11, and 12, in one aspect of the disclosure, which may include at least a portion of the subject matter of any of the preceding and/or following examples and aspects, the print unit 310 includes a feed unit 313 configured to provide the material 720 into the inlet opening 304A of the extrusion nozzle 300. For example, the feed unit 313 may include drive wheels 313W that frictionally engage the material 720 or are otherwise configured to move the material 720 from a material source 720S (e.g., a spool) and feed the material 720 into the inlet opening 304A of the extrusion nozzle 300, where it may be softened or otherwise liquefied in any suitable manner, such as by one or more heating elements 315. In other aspects, the material may be softened or otherwise liquefied by the feed unit prior to entering the extrusion nozzle.

Referring to FIGS. 3 and 9, in one aspect of the disclosure, which may include at least a portion of the subject matter of any of the preceding and/or following examples and aspects, the print unit 310 includes a first linear (X-axis) drive 311 and a second linear (Y-axis) drive 312, configured to move the extrusion nozzle 300 in the build plane 700, e.g., along the frame 310F. In one example, the first linear drive 311 may be connected to the frame 310F and the second linear drive 312 may be connected to the frame 320F (or 310F) in any suitable manner, such as through any suitable drive transmission so that that the first linear drive 311 and the second linear drive 312 effect movement of the extrusion nozzle 300 in the X and Y directions, as illustrated, e.g., in FIG. 9. For example, the first linear drive 311 may mounted to the frame 310F and move the extrusion nozzle 300 along the frame 310F in the X-direction relative to the build platform 323. The second linear drive 312 may be mounted to frame 320F (or frame 310F) and move frame 310F relative to frame 320F so that the extrusion nozzle 300 is moved in the Y-axis direction relative to the build platform 323. In one aspect of the disclosure, which may include at least a portion of the subject matter of any of the preceding and/or following examples and aspects, the apparatus 320, e.g. the three dimensional printing system, also includes a third linear (Z-axis) drive 322 configured to move the build platform 323 in a direction substantially perpendicular to the build plane 700. In one example, the third linear drive 322 may be connected to the frame 320F. As shown in FIG. 9, for example, the build plane 700 may be an X-Y plane. The third linear drive 322 may be configured to move the build platform 323 along the Z-axis using any suitable linear drive mechanism. Referring to FIGS. 3 and 9, in one aspect of the disclosure, which may include at least a portion of the subject matter of any of the preceding and/or following examples and aspects, the apparatus 320, e.g. three dimensional printing system, includes a controller 321, configured to control a motion of the extrusion nozzle 300 and extrusion of material 720 onto the build platform 323. In one example, the extrusion nozzle 300 may move in the build plane 700. For example the first, second and third linear drives 311, 312, 322 and the feed unit 313 may be operatively connected to the controller 321 for moving the extrusion nozzle 300 and controlling, for example, a flow rate of material 720 extruded from the extrusion nozzle 300.

Referring to FIGS. 3, 9, 13, 14, and in particular to FIG. 15, one example of the present disclosure relates to a method of extruding material, e.g., the material 720. The method includes providing the extrusion nozzle 300 that includes the rotary drive engagement portion 305, the inlet end 301, the inlet opening 304A at the inlet end 301, the outlet end 302, and the outlet opening 304B at the outlet end 302 (FIG. 15, Block 1500). The method also includes moving the extrusion nozzle 300 along the tool path 710 and simultaneously rotating the extrusion nozzle 300 about the rotary axis 303 using the rotary drive engagement portion 305 to maintain the outlet opening 304B of the extrusion nozzle 300 in a predetermined orientation relative to the tool path 710 (FIG. 15, Block 1501) while extruding material 720 from the outlet opening 304B (FIG. 15, Block 1502).

The disclosure and drawing figure(s) describing the operations of the method(s) set forth herein should not be interpreted as necessarily determining a sequence of such operations. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Referring to FIGS. 9, 13, and 14, in one aspect of the disclosure, which may include at least a portion of the subject matter of any of the preceding and/or following examples and aspects, the method also includes moving the extrusion nozzle 300 in the build plane 700 of the three dimensional printing system, i.e., the apparatus 320, along, for example, the tool path 710 so that layers 1200, 1201 of material 720 are deposited (FIG. 15, Block 1505). Referring to FIG. 14, in one aspect of the disclosure, which may include at least a portion of the subject matter of any of the preceding and/or following examples and aspects, the method also includes extruding the material 720 as the bead 1210 having a generally rectangular cross-section (FIG. 15, Block 1506). Each of the beads 1210 includes four sides S1-S4. As illustrated in FIG. 14, cross-sectional dimensions of two of the sides S3, S4 are greater than those of the other two sides S1, S2. In other aspects, the cross-sectional dimensions of the sides S1-S4 may have substantially the same length. In still other aspects, the cross-sectional dimensions of the sides S3, S4 may be shorter than those of the other two sides S1, S2. In one aspect of the disclosure, which may include at least a portion of the subject matter of any of the preceding and/or following examples and aspects, the method also includes maintaining the outlet opening 304B tangent to the tool path 710, so that the lateral sides S1, S2 of the beads 1210 are substantially aligned with the tool path 710 and/or the lateral sides S1, S2 of previously deposited beads 1210 (FIG. 15, Block 1507).

As shown in FIG. 13, in one aspect of the disclosure, which may include at least a portion of the subject matter of any of the preceding and/or following examples and aspects, the method also includes extruding the material 720 in a direction non-parallel to the rotary axis 303 (FIG. 15, Block 1508). In one example, the material 720 may exit the outlet opening 304B of the extrusion nozzle 300 in a direction generally perpendicular to the axis 303. In one aspect of the disclosure, which may include at least a portion of the subject matter of any of the preceding and/or following examples and aspects, the method also includes extruding the material 720 substantially parallel with the rotary axis 303, so that the material 720 may be driven under a pressure, e.g. by the extrusion from the outlet opening 304B, into the previously deposited layer 1210, which may improve adhesion between the layers (FIG. 15, Block 1509).

In one aspect of the disclosure, which may include at least a portion of the subject matter of any of the preceding and/or following examples and aspects, the method also includes controlling a flow rate of the material 720 extruded from the outlet opening 304B with the controller 321, e.g., to maintain predetermined pressure in the cavity 304 and to control the amount of material being deposited (FIG. 15, Block 1510). In one aspect of the disclosure, which may include at least a portion of the subject matter of any of the preceding and/or following examples and aspects, the method also includes maintaining an outlet pressure at the outlet opening 304B that is at least as high as an inlet pressure at the inlet opening 304A (FIG. 15, Block 1511). In one aspect of the disclosure, which may include at least a portion of the subject matter of any of the preceding and/or following examples and aspects, the method also includes maintaining a substantially linear pressure gradient between the inlet end 301 and the outlet end 302 (FIG. 15, Block 1512). In one aspect, the outlet pressure and/or pressure gradient may be maintained by controlling the flow rate of material 720 and/or by the taper of the cavity 304.

In one aspect of the disclosure, which may include at least a portion of the subject matter of any of the preceding and/or following examples and aspects, the method also includes forming the extrusion nozzle 300 by additive metal fabrication (FIG. 15, Block 1513). In one aspect of the disclosure, which may include at least a portion of the subject matter of any of the preceding and/or following examples and aspects, the extrusion nozzle 300 is formed by laser sintering (FIG. 15, Block 1514). In one aspect of the disclosure, which may include at least a portion of the subject matter of any of the preceding and/or following examples and aspects, the extrusion nozzle 300 is formed as a monolithic member (FIG. 15, Block 1515).

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Having the benefit of the teachings presented in the foregoing description and the associated drawings, many modifications of the disclosed subject matter will become apparent to one skilled in the art to which this disclosure pertains. Therefore, it is to be understood that the disclosure is not to be limited to the specific examples and aspects provided and that modifications thereof are intended to be within the scope of the appended claims. Moreover, although the foregoing disclosure and the associated drawings describe certain illustrative combinations of elements and/or functions, it should be appreciated that different combinations of elements and/or functions may be realized without departing from the scope of the appended claims.

What is claimed is:

1. A method of extruding material, the method comprising:
   providing an extrusion nozzle including a rotary drive engagement portion, and a cavity including an inlet end, an inlet opening at the inlet end, an outlet end, an outlet opening at the outlet end, and an external surface extending between the inlet end and the outlet end, wherein
   a wall thickness of the extrusion nozzle between the external surface of the extrusion nozzle and a surface of the cavity varies in a plane containing a rotary axis of the extrusion nozzle that extends between the inlet end and the outlet end, and
   the cavity has a path that is non-linear; and
   moving the extrusion nozzle along a tool path and simultaneously rotating the extrusion nozzle about the rotary axis using the rotary drive engagement portion to maintain the outlet opening of the extrusion nozzle in a predetermined orientation relative to the tool path while extruding the material from the outlet opening.

2. The method of claim 1, further comprising extruding the material as a bead having a generally rectangular cross-section.

3. The method of claim 1, further comprising extruding the material in a direction non-parallel to the rotary axis.

4. The method of claim 1, further comprising extruding the material substantially parallel with the rotary axis.

5. The method of claim 1, further comprising maintaining an outlet pressure at the outlet opening that is at least as high as an inlet pressure at the inlet opening.

6. The method of claim 1, further comprising maintaining a substantially linear pressure gradient between the inlet end and the outlet end.

7. The method of claim 1, further comprising forming the extrusion nozzle by additive metal fabrication.

8. The method of claim 7, wherein the extrusion nozzle is formed by laser sintering.

9. The method of claim 7, wherein the extrusion nozzle is formed as a monolithic member.

10. The method of claim 1, further comprising maintaining the outlet opening tangent to the tool path.

11. The method of claim 1, further comprising moving the extrusion nozzle in a build plane of a three-dimensional printing system.

12. The method of claim 1, further comprising controlling a flow rate of the material extruded from the outlet opening with a controller.

13. A method of extruding material, the method comprising:
   providing a three-dimensional printing system including a build platform and a print unit;
   providing, in the print unit, an extrusion nozzle including a rotary drive engagement portion, and a cavity including an inlet end, an inlet opening at the inlet end, an outlet end, an outlet opening at the outlet end, and an external surface extending between the inlet end and the outlet end, wherein a wall thickness of the extrusion nozzle between the external surface of the extrusion nozzle and a surface of the cavity varies in a plane containing a rotary axis of the extrusion nozzle that extends between the inlet end and the outlet end, and the cavity has a path that is non-linear; and moving the extrusion nozzle, relative to the build platform, along a tool path and simultaneously rotating the extrusion nozzle about the rotary axis with a rotary drive of the print unit engaged to the rotary drive engagement portion to maintain the outlet opening of the extrusion nozzle in a predetermined orientation relative to the tool path while extruding the material from the outlet opening.

14. The method of claim 13, further comprising extruding the material as a bead having a generally rectangular cross-section.

15. The method of claim 13, further comprising extruding the material in a direction non-parallel to the rotary axis.

16. The method of claim 13, further comprising extruding the material substantially parallel with the rotary axis.

17. The method of claim 13, further comprising maintaining an outlet pressure at the outlet opening that is at least as high as an inlet pressure at the inlet opening.

18. The method of claim 13, further comprising maintaining a substantially linear pressure gradient between the inlet end and the outlet end.

19. The method of claim 13, further comprising maintaining the outlet opening tangent to the tool path.

20. The method of claim 13, further comprising controlling a flow rate of the material extruded from the outlet opening with a controller.

* * * * *